(12) United States Patent  
Zhang et al.

(10) Patent No.: US 10,785,764 B2  
(45) Date of Patent: Sep. 22, 2020

(54) INFORMATION CHANGE TRANSMISSION METHOD AND DEVICE FOR SINGLE-CELL MULTICAST SERVICE

(71) Applicants: Chongming Zhang, Pudong, Shanghai (CN); Sharp Kabushiki Kaisha, Sakai, Osaka (JP); FG Innovation Company Limited, Tuen Mun (CN)

(72) Inventors: Chongming Zhang, Shanghai (CN); Renmao Liu, Shanghai (CN); Shohei Yamada, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/324,359

(22) PCT Filed: Aug. 10, 2017

(86) PCT No.: PCT/CN2017/096794  
§ 371 (c)(1),  
(2) Date: Feb. 8, 2019

(87) PCT Pub. No.: WO2018/028631  
PCT Pub. Date: Feb. 15, 2018

(65) Prior Publication Data  
US 2019/0174474 A1 Jun. 6, 2019

(30) Foreign Application Priority Data  
Aug. 11, 2016 (CN) .......................... 2016 1 0658544

(51) Int. Cl.  
*H04W 72/04* (2009.01)  
*H04W 4/06* (2009.01)  
(Continued)

(52) U.S. Cl.  
CPC ........... *H04W 72/042* (2013.01); *H04W 4/06* (2013.01); *H04W 68/005* (2013.01); *H04L 12/189* (2013.01)

(58) Field of Classification Search  
CPC ....... H04W 4/06; H04W 4/50; H04W 68/005; H04W 4/70; H04W 80/02; H04W 88/02;  
(Continued)

(56) References Cited

U.S. PATENT DOCUMENTS

2010/0178895 A1* 7/2010 Maeda .................... H04W 4/90  
                                                  455/404.1  
2016/0227383 A1* 8/2016 Lin ......................... H04W 4/08  
(Continued)

FOREIGN PATENT DOCUMENTS

CN      101998270 A     3/2011

OTHER PUBLICATIONS

3RD Generation Partnership Project (3GPP TM), Technical Specification Group Radio Access Network; Evolved Universal Terrestrial Radio Access (E-UTRA); Multiplexing and channel coding, (Release 13), 3GPP TS 36.212 V13.2.0, Jun. 2016, Valbonne, France.

(Continued)

*Primary Examiner* — Jung Liu  
(74) *Attorney, Agent, or Firm* — ScienBiziP, P.C.

(57) ABSTRACT

The present application provides an information change transmission method and device related to a single-cell multicast service. According to one aspect, a method executed by user equipment (UE) is provided, comprising: receiving downlink control information (DCI) on a second narrow-band physical downlink control channel (NPDCCH); receiving an information change notification for a single-cell multicast control channel (SC-MCCH) according to the information on the second NPDCCH; and receiving (Continued)

SC-MCCH information according to an indication of DCI on a first NPDCCH. The SC-MCCH information change notification is comprised in the DCI of the second NPDCCH or a message indicated by the DCI of the second NPDCCH. The present application further provides a corresponding method executed by a base station, and corresponding user equipment (UE) and a base station.

6 Claims, 4 Drawing Sheets

(51) Int. Cl.
*H04W 68/00* (2009.01)
*H04L 12/18* (2006.01)

(58) Field of Classification Search
CPC ..... H04W 72/042; H04W 8/08; H04W 76/11; H04W 72/005; H04W 48/16; H04W 72/1252; H04W 4/80; H04W 24/08; H04W 72/0446; H04W 88/06; H04W 72/0453; H04W 76/27; H04W 80/08; H04L 1/0061
See application file for complete search history.

(56) References Cited

U.S. PATENT DOCUMENTS

| | | | |
|---|---|---|---|
| 2017/0223725 A1* | 8/2017 | Xiong | H04L 5/0053 |
| 2017/0353946 A1* | 12/2017 | Rico Alvarino | H04W 4/70 |
| 2018/0316464 A1* | 11/2018 | Stern-Berkowitz | H04L 1/1657 |
| 2019/0174510 A1* | 6/2019 | Shin | H04W 72/042 |
| 2019/0182632 A1* | 6/2019 | Fujishiro | H04W 72/005 |
| 2019/0222967 A1* | 7/2019 | Ratilainen | H04W 56/001 |
| 2019/0223197 A1* | 7/2019 | Shin | H04W 24/08 |

OTHER PUBLICATIONS

Vodafone, Huawei, Hisilicon, Ericsson, Qualcomm, New work item proposal: Enhancements of NB-IoT, 3GPP TSG RAN Meeting #72, RP-161324, Jun. 13-16, 2016, Busan, Korea.

Qualcomm Incorporated, New Work Item: NarrowBand IOT (NB-IOT), 3GPP TSG RAN Meeting #69, RP-151621, Sep. 14-16, 2015, Phoenix, USA.

* cited by examiner

INFORMATION CHANGE TRANSMISSION METHOD AND DEVICE FOR SINGLE-CELL MULTICAST SERVICE

TECHNICAL FIELD

The present invention relates to the field of wireless communications technology. More specifically, the present invention relates to an information change transmission method and device for a single-cell multicast service.

BACKGROUND

With the rapid growth of mobile communication and great progress of technology, the world will move toward a fully interconnected network society where anyone or anything can acquire information and share data anytime and anywhere. It is estimated that there will be 50 billion interconnected equipment by 2020, of which only about 10 billion may be mobile phones and tablet computers. The rest are not machines communicating with human beings but machines communicating with one another. Therefore, how to design a system to better support the Internet of Everything is a subject needing further and intensive study.

For better implementation of the Internet of Everything, at the 3GPP RAN #69 plenary meeting held in September 2015, a new work item was proposed in the Third Generation Partnership Project (3GPP) Long Term Evolution Project (LTE) standard (see non-patent document: RP-151621 New Work Item: NarrowBand IoT (NB-IoT), which may be referred to as narrowband Internet of Things (NB-IoT). In the description of this project, NB IoT is configured to be a narrow band system that operates on 180 KHz uplink and downlink, so that terminals in the Internet of Things would meet the requirements such as low power consumption, long standby, cost reduction, wide coverage, and others. The first phase of the NB-IoT system has completed basic function designs, including broadcast notification of system information, point-to-point unicast uplink data transmission, and downlink data reception. Considering multicast requirements for software download, terminal system upgrade, and packet information delivery in the future Internet of Things, it was determined that a new work item was needed to enhance NB-IoT and achieve multicast at the 3GPP RAN #72 plenary meeting held in June 2016 (see non-patent document: RP-161324 New work item proposal: Enhancements of NB-IoT). It was clearly pointed out that multicast transmission in the NB-IoT system is to be implemented on the basis of the features of the existing version 13 LTE SC-PTM.

In an existing LTE system, SC-PTM (single-cell point-to-multipoint) refers to multicast transmission of a multimedia broadcast service performed within a single cell. The feature introduces two logical channels: an SC-MCCH and an SC-MTCH, which are multiplexed on a DL-SCH transmission layer channel. The SC-MCCH (Single-Cell Multicast Control Channel) is a control channel, and information carried on the channel includes a multicast service type broadcasted in a current cell, and scheduling and receiving configurations of the service channel SC-MTCH on which the multicast service is provided; the SC-MTCH (Single-Cell Multicast Traffic Channel) is a service channel carrying specific service content.

A terminal interested in a multicast service first acquires scheduling and configuration of an SC-MCCH channel through the broadcast content on a system information block SIB20, and then acquires information carried on the control channel. If the service the terminal is interested in exists in a current cell, the terminal establishes, according to scheduling and reception configuration of an SC-MTCH corresponding to the service and carried on the SC-MCCH, a corresponding radio bearer S-MRB (Single Cell Multimedia Broadcast Multicast Service Point to Multipoint Radio Bearer), including configuring an RLC (Radio Link Control) layer, a MAC (Media Access Control) layer, and a physical layer; then, the terminal starts receiving service information.

At the same time, the terminal further needs to periodically monitor whether information on the SC-MCCH channel changes, so as to obtain updated information on the SC-MCCH channel in time. A change notification only occurs during a change period. In a change period, a network repeatedly broadcast the same SC-MCCH information. Once a new service starts or ends, corresponding SC-MCCH information needs to be changed; and the network will broadcast both a change indication and information indicating new information of SC-MCCH information transmission in a next change period. When the next change period arrives, the network transmits downlink control information on a physical downlink control channel (PDCCH), and the PDCCH is scrambled by using an SC-N-RNTI. The DCI carried in the PDCCH includes 8-bit information, in which the last bit is set to '1' to indicate that information on the SC-MCCH is changed. After receiving the indication, a user needs to acquire, in the same subframe, the PDCCH that schedules an SC-MCCH transmission. The PDCCH is scrambled by using the SC-RNTI, where the DCI indicates information about the SC-MCCH transmission. The user may receive the changed SC-MCCH information on a corresponding time-frequency resource according to the information.

However, in the NB-IoT system, in order to reduce costs, the system based on a narrowband design does not support transmitting a change indication and scheduling a new SC-MCCH information transmission in the same subframe. Therefore, when the SC-PTM feature is introduced for the NB-IoT system, a new change notification mechanism is needed for the NB-IoT system.

In addition, the existing SC-PTM only uses one bit to indicate an SC-MCCH information change; nevertheless, the SC-MCCH information change is usually caused by one or several service information changes. At the same time, because indicated information is limited, all terminals receive SC-MCCH information when receiving the change indication. If service information of interest to the terminals is not changed, such reception causes additional power consumption for these terminals. Considering the design purpose of NB-IoT, one should try to avoid unnecessary power consumption as much as possible.

SUMMARY OF INVENTION

In order to resolve the above technical problems, the present application provides an information change transmission method and device related to a single-cell multicast service.

Specifically, according to an aspect of the present invention, a method executed by user equipment (UE) is provided, comprising: receiving downlink control information (DCI) on a second narrow-band physical downlink control channel (NPDCCH); receiving an information change notification for a single-cell multicast control channel (SC-MCCH) according to the information on the second NPDCCH; and receiving SC-MCCH information according to an indication of DCI on a first NPDCCH. The SC-MCCH information change notification is comprised in the DCI carried in the second NPDCCH or a message indicated by the DCI carried in the second NPDCCH.

According to another aspect of the present invention, a method executed by user equipment (UE) is provided, comprising: receiving a narrow-band physical downlink control channel (NPDCCH); and when an information change notification for a single-cell multicast control channel (SC-MCCH) is received in a field of a downlink control information (DCI) on the NPDCCH, receiving SC-MCCH information according to an indication of the same DCI.

According to another aspect of the present invention, user equipment (UE) is provided, comprising: a first receiving unit, configured to receive downlink control information (DCI) on a second narrow-band physical downlink control channel (NPDCCH); a monitoring unit, configured to receive an information change notification for a single-cell multicast control channel (SC-MCCH) according to the information on the second NPDCCH; and a second receiving unit, configured to receive SC-MCCH information according to an indication of DCI on a first NPDCCH. The SC-MCCH information change notification is comprised in the DCI carried in the second NPDCCH or a message indicated by the DCI carried in the second NPDCCH.

According to another aspect of the present invention, user equipment (UE) is provided, comprising: a first receiving unit, configured to receive a narrow-band physical downlink control channel (NPDCCH); and a second receiving unit, configured to receive, when an information change notification for a single-cell multicast control channel (SC-MCCH) is received in downlink control information (DCI) on the NPDCCH, SC-MCCH information according to an indication of the DCI.

According to another aspect of the present invention, a method executed by a base station is provided, comprising: transmitting downlink control information (DCI) on a second narrow-band physical downlink control channel (NPDCCH), wherein the DCI or a message indicated by the DCI comprises an information change notification for a single-cell multicast control channel (SC-MCCH); and transmitting DCI on a first NPDCCH indicate transmission of SC-MCCH information, and transmitting the SC-MCCH information according to the indication of the DCI on the first NPDCCH.

According to another aspect of the present invention, a method executed by a base station is provided, comprising: transmitting downlink control information (DCI) on a narrow-band physical downlink control channel (NPDCCH), wherein the DCI comprises an information change notification for a single-cell multicast control channel (SC-MCCH) and an indication of transmission of SC-MCCH information; and transmitting the SC-MCCH information according to the indication of the DCI.

According to another aspect of the present invention, a base station is provided, comprising: a first transmitting unit, configured to transmitting downlink control information (DCI) on a second narrow-band physical downlink control channel (NPDCCH), wherein the DCI or a message indicated by the DCI comprises an information change notification for a single-cell multicast control channel (SC-MCCH); and a second transmitting unit, configured to transmit DCI on a first NPDCCH to indicate transmission of SC-MCCH information, and transmit the SC-MCCH information according to the indication of the DCI on the first NPDCCH.

According to another aspect of the present invention, a base station is provided, comprising: a first transmitting unit, configured to send downlink control information (DCI) on a narrow-band physical downlink control channel (NPDCCH), wherein the DCI comprises an information change notification for a single-cell multicast control channel (SC-MCCH) and an indication of transmission of SC-MCCH information; and a second transmitting unit, configured to send the SC-MCCH information according to the indication of the DCI.

BRIEF DESCRIPTION OF DRAWINGS

The above and other features of the present application will become more apparent through the following detailed description made in conjunction with the accompanying drawings, where.

DETAILED DESCRIPTION OF EMBODIMENTS

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

In the following description, an LTE mobile communications system and its later evolved versions are used as exemplary application environments; a base station and a terminal device that support NB-IoT are used as examples to set forth multiple embodiments of the present invention in detail. However, it should be noted that the present invention is not limited to the following embodiments, but is applicable to more other wireless communications systems, such as a future 5G cellular communications system, and is applicable to other base stations and terminal devices, such as base stations and terminal devices supporting eMTC, MMTC, and so on.

Prior to the specific description, the abbreviations of several terms mentioned in the present invention are explained as follows. The abbreviations of the terms involved in the present invention shall have the meanings set forth below, unless otherwise indicated.

SC-MTCH (single-cell multicast service channel)
NPDCCH (narrowband physical downlink control channel)
DCI (downlink control information)
SC-RNTI (single cell radio access network temporary identifier)
SC-N-RNTI (single cell notification radio access network temporary identifier)
P-RNTI (paging radio access network temporary identifier)
DII (direct indication information)
CRC (cyclic redundancy check)
TMGI (temporary mobile group identity)
MBMS (multimedia broadcast multicast service)

Figure 1:
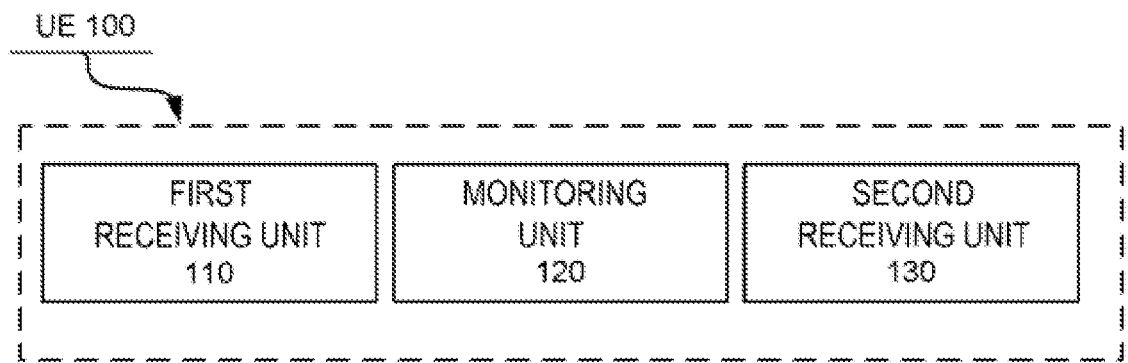
FIG. 1 is a block diagram of user equipment according to an embodiment of the present application.

FIG. 1 is a block diagram of user equipment (UE) (which may also be referred to as a terminal hereinafter) according to an embodiment of the present application. As shown in FIG. 1, UE 100 includes a first receiving unit 110, a monitoring unit 120, and a second receiving unit 130.

In an embodiment, the first receiving unit 110 is configured to receive downlink control information (DCI) on a second narrow-band physical downlink control channel (NPDCCH). The monitoring unit 120 is configured to receive an information change notification for a single-cell multicast control channel (SC-MCCH) according to the information on the second NPDCCH. In this embodiment, the SC-MCCH information change notification is comprised in a field of the DCI of the second NPDCCH or a message indicated by the DCI of the second NPDCCH. The second receiving unit 130 is configured to receive SC-MCCH information according to an indication of DCI on a first NPDCCH.

Optionally, the UE 100 may further receive configuration information related to an SC-MCCH. The configuration information includes carrier related information or time related information for receiving the first NPDCCH, or carrier related information or time related information for receiving the second NPDCCH.

Optionally, when the first NPDCCH and the second NPDCCH are on the same carrier, the first NPDCCH and the second NPDCCH are not within the same subframe. When the first NPDCCH and the second NPDCCH are on different carriers, the first NPDCCH and the second NPDCCH are within the same subframe or within different subframes.

Optionally, the SC-MCCH information change notification may be included in a direct indication information (DII) message, and the message is in an NPDCCH DCI format and scrambles a CRC check code by using a single cell radio access network temporary identifier (SC-RNTI) or a paging radio network temporary identifier (P-RNTI). In addition, the SC-MCCH information change notification may further be included in a paging message, and DCI indicating transmission of the paging message is in an NPDCCH DCI format and scrambles a CRC check code by using a P-RNTI.

Optionally, if the second NPDCCH indicates the transmission of the paging message, the paging message is received according to the indication; and the SC-MCCH information change notification included in the paging message is checked.

Optionally, the SC-MCCH information change notification is indicated by one bit or a plurality of bits.

In another embodiment, the first receiving unit 110 may be configured to receive a narrow-band physical downlink control channel (NPDCCH). The second receiving unit 130 is configured to receive, when an information change notification for a single-cell multicast control channel (SC-MCCH) is received in a field of a downlink control information (DCI) on the NPDCCH, SC-MCCH information according to an indication of the same DCI.

Figure 2:
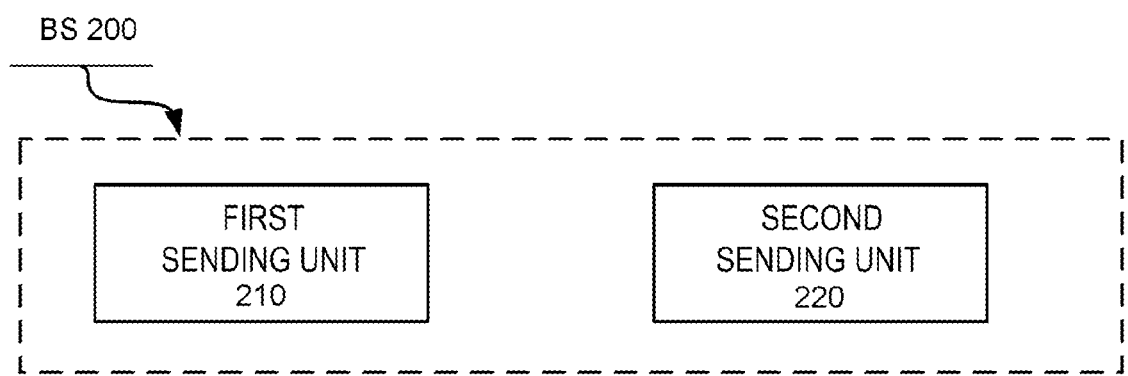
FIG. 2 is a block diagram of a base station according to an embodiment of the present application.

FIG. 2 is a block diagram of a base station (BS) according to an embodiment of the present application. As shown in FIG. 2, the BS 200 includes a first sending unit 210 and a second sending unit 220.

In an embodiment, the first sending unit 210 is configured to send downlink control information (DCI) on a second narrow-band physical downlink control channel (NPDCCH), wherein the DCI or a message indicated by the DCI includes an information change notification for a single-cell multicast control channel (SC-MCCH). The second sending unit 220 is configured to send downlink control information (DCI) on a first NPDCCH to indicate transmission of SC-MCCH information, and send SC-MCCH information according to the indication of the DCI on the first NPDCCH.

Optionally, the BS 200 sends configuration information related to an SC-MCCH, wherein the configuration information includes carrier related information or time related information for receiving the first NPDCCH, or carrier related information or time related information for receiving the second NPDCCH.

Optionally, when the first NPDCCH and the second NPDCCH are on the same carrier, the first NPDCCH and the second NPDCCH are not within the same subframe. When the first NPDCCH and the second NPDCCH are on different carriers, the first NPDCCH and the second NPDCCH are within the same subframe or within different subframes.

Optionally, the SC-MCCH information change notification may be included in a field of a direct indication information (DII) message, and the message is in an NPDCCH DCI format and scrambles a CRC check code by using a single cell radio access network temporary identifier (SC-RNTI) or a paging radio network temporary identifier (P-RNTI).

Optionally, the SC-MCCH information change notification may be included in a field of a paging message, and DCI indicating transmission of the paging message is in an NPDCCH DCI format and scrambles a CRC check code by using a P-RNTI.

Optionally, the BS 200 sends a paging message including the SC-MCCH information change notification.

Optionally, the SC-MCCH information change notification is indicated by one bit or a plurality of bits.

In another embodiment, the first sending unit 210 is configured to send downlink control information (DCI) on a narrow-band physical downlink control channel (NPDCCH), where the DCI includes an information change notification for a single-cell multicast control channel (SC-MCCH) and an indication of transmission of SC-MCCH information. The second sending unit 220 is configured to send the SC-MCCH information according to the indication of the DCI.

Several examples of the present invention are described in detail below.

Example 1

A terminal receives configuration information of an SC-PTM control channel SC-MCCH, where the configuration information may be broadcast by using a system message or may be issued to the terminal by using dedicated signaling.

The configuration information is used to acquire SC-MCCH information. The configuration information may include information about a carrier for receiving the SC-MCCH channel, or a subframe offset for receiving the SC-MCCH channel, and may be used for receiving a first NPDCCH described below. In addition, the configuration information may further include receiving information about a carrier for reception of an SC-MCCH information change notification, or a subframe offset the SC-MCCH information change notification, and may be used for receiving a second NPDCCH described below.

The SC-MCCH information refers to information/messages carried on the SC-MCCH channel. Transmission of the SC-MCCH information may be indicated by an NPDCCH (referred to herein as the first NPDCCH) in an NB-IoT system. DCI carried on the first NPDCCH indicates in some fields about time-frequency resource and encoding information for an SC-MCCH transmission, and optionally, repeated times of SC-MCCH transmissions. The terminal may receive the SC-MCCH information according to the indication of the DCI.

The terminal starts to monitor the second NPDCCH after first receiving the information/messages transmitted on the SC-MCCH according to the configuration information. Upon receiving a change indication of the SC-MCCH information according to DCI information carried on the second NPDCCH, the SC-MCCH information is acquired again according to the indication of the DCI on the first NPDCCH. The process specifically includes:

Scheme one. According to the configuration information, if the configuration information includes only related information of the first NPDCCH, locations at which the first NPDCCH and the second NPDCCH may appear may be considered to be the same; and the terminal needs to perform detection at these locations. The detection process includes:

First, in order to distinguish the first NPDCCH from the second NPDCCH, a network uses different RNTIs to scramble CRC check codes of the DCIs on the first NPDCCH and the second NPDCCH. Specifically, the CRC check code of the DCI on the first NPDCCH may be scrambled by using an existing SC-RNTI or a newly designed RNTI; and the CRC check code of the DCI on the second NPDCCH may be scrambled by using an existing SC-N-RNTI or P-RNTI or a newly designed RNTI, which is different from that of the first NPDCCH.

Based on different RNTIs, if the terminal detects that the DCI is scrambled by using the SC-N-RNTI at a particular location, it indicates that the second NPDCCH appears at this time point; and then the terminal reads a change notification therein and continues detection at a next location. If the SC-RNTI is detected, it indicates that the first NPDCCH appears at this time point; and then the terminal reads the SC-MCCH transmission information therein so as to acquire the SC-MCCH information.

Preferably, the network and the terminal may agree on or notify one another in advance of a location where the second NPDCCH may occur. For example, the SC-MCCH is periodically transmitted in a change period. If change information occurs, the network will release the change information at a location of an odd (or even) period of the SC-MCCH transmission during a change period. For example, when a change period includes six SC-MCCH transmission times, SC-MCCH information transmitted at the six transmission times is the same when no change occurs. However, during reception, the terminal selectively performs RNTI detection only at the first, the third, and the fifth transmission times of the change period, and determines whether an SC-RNTI or an SC-N-RNTI appears at this time. If an SC-RNTI appears, it indicates that the information is not changed. If an SC-N-RNTI appears, it indicates that the information is changed; and the SC-MCCH information will be received at a next time, for example, at the second, the fourth, and the sixth transmission times.

Scheme two. The first NPDCCH and the second NPDCCH are included in the same common search space, and may adopt an existing Type2-NPDCCH common search space design or a similar common search space. The common search space consists of a plurality of subframes and may include a plurality of NPDCCHs. The terminal needs to detect different NPDCCHs in the same common search space. The detection process includes:

First, in order to distinguish the first NPDCCH from the second NPDCCH, a network uses different RNTIs to scramble CRC check codes of the DCIs on the first NPDCCH and the second NPDCCH. Specifically, the CRC check code of the DCI on the first NPDCCH may be scrambled by using an existing SC-RNTI or a newly designed RNTI; and the CRC check code of the DCI on the second NPDCCH may be scrambled by using an existing SC-N-RNTI or P-RNTI or a newly designed RNTI, which is different from that of the first NPDCCH.

Starting from a starting location of the common search space, the terminal sequentially searches for NPDCCHs that may be included in the space, and detects whether DCI scrambled by using the SC-N-RNTI exists. For example, the common search space includes 10 subframes; the 0th-3rd subframes refer to a location where a first NPDCCH locates; the 4th-6th subframes refer to a location where a second NPDCCH locates; and the 7th-9th subframes refer to a location where a third NPDCCH locates. The terminal receives the first to third NPDCCHs on the respective and corresponding subframes and detects whether CRC check codes of the NPDCCHs are scrambled by using an SC-N-RNTI, so as to determine whether the second NPDCCH exists. If so and an information change is indicated, the terminal searches for DCI scrambled by using an SC-RNTI, i.e., the first NPDCCH, in the same common search space, thereby acquiring the SC-MCCH information.

Scheme three. If the DCI carrying the change notification is scrambled by using the P-RNTI, the terminal first acquires the second NPDCCH.

If the second NPDCCH indicates transmission of a paging message, the terminal receives the paging message according to the indication, and checks the information change notification included in the paging message.

If an information change is indicated, the terminal receives the SC-MCCH transmission information on the first NPDCCH, thereby acquiring the SC-MCCH information; or if no information change is indicated, the terminal does not need to update the SC-MCCH information.

If a direct indication information message is carried in the second NPDCCH (i.e., the transmission of the paging message not indicated), the terminal checks the information change notification included in the DCI.

If an information change is indicated, the terminal receives the SC-MCCH transmission information on the first NPDCCH, thereby acquiring the SC-MCCH information; or if no information change is indicated, the terminal does not need to update the SC-MCCH information.

Scheme four. The configuration information respectively includes information about a location (e.g., a carrier or a time) for receiving the first NPDCCH and information about a location (e.g., carrier or time) for receiving the second NPDCCH. In this case, the terminal first performs reception at the location of the second NPDCCH. If the terminal receives DCI indicating a change, the SC-MCCH transmission information is received on the first NPDCCH, thereby acquiring the SC-MCCH information. If DCI indicating a change is not received, it means that the SC-MCCH information is not changed; and the terminal does not need to receive the SC-MCCH transmission information at the location of the first NPDCCH.

Optionally, when the first NPDCCH channel and the second NPDCCH channel are on the same carrier, the first NPDCCH channel and the second NPDCCH channel do not exist in the same subframe.

Optionally, when the first NPDCCH channel and the second NPDCCH channel are on different carriers, the first NPDCCH channel and the second NPDCCH channel may exist in the same subframe or may exist in different subframes.

In all the foregoing schemes, optionally, the DCI on the first NPDCCH may adopt an existing NB-IoT DCI format: NPDCCH DCI format N1 or N2 (the definition of which can be found in TS 36.212); or a newly designed NPDCCH DCI format may be used. At the same time, the CRC check code of the DCI may be scrambled by using an existing SC-RNTI or a newly designed RNTI.

The SC-MCCH information change notification may be included in a field of the DCI carried on the second NPDCCH. Optionally, the DCI on the second NPDCCH may adopt the existing NB-IoT DCI format: NPDCCH DCI format N1 or N2 (the definition of which can be found in TS 36.212); or a newly designed NPDCCH DCI format may be used; and the CRC check code of the DCI may be scrambled by using an existing SC-N-RNTI or a newly designed RNTI (the RNTI may be the same as or different from the RNTI on the first NPDCCH).

Optionally, when the SC-MCCH information change notification is included in a direct indication information message, the message may adopt the existing NB-IoT DCI format: NPDCCH DCI format N1 or N2 (the definition thereof can be found in TS 36.212); or a newly designed NPDCCH DCI format may be used At the same time, a CRC check code of the direct indication information message may be scrambled by using an existing SC-RNTI or a newly designed RNTI, or by using an existing P-RNTI for paging or a newly designed RNTI for paging.

Optionally, the SC-MCCH information change notification may be included in a paging message, and DCI indicating transmission of the paging message may adopt the existing NB-IoT DCI format: NPDCCH DCI format N1 or N2 (the definition of which can be found in TS 36.212); or a newly designed NPDCCH DCI format may be used; or a CRC check code of the paging message may be scrambled by using an existing P-RNTI for paging or a newly designed RNTI for paging.

Example 2

A terminal receives configuration information of an SC-PTM control channel SC-MCCH, where the configuration information may be broadcast by using a system message or may be issued to the terminal by using dedicated signaling.

The configuration information is used to receive SC-MCCH information. The configuration information may include information about a carrier for reception of the SC-MCCH channel, a subframe offset for reception of the SC-MCCH channel, repeated times of SC-MCCH transmissions, or the like, and may be used for reception of a first NPDCCH described below.

The SC-MCCH information refers to information/message propagating on the SC-MCCH channel. Transmission of the SC-MCCH information is indicated by an NPDCCH (referred to herein as the first NPDCCH). DCI carried on the first NPDCCH indicates in some fields about time-frequency resource and encoding information for an SC-MCCH transmission, as well as repeated times of SC-MCCH transmissions, and the like. The terminal may acquire the SC-MCCH information according to the indication included in the DCI. Optionally, the DCI on the first NPDCCH may adopt the format NPDCCH DCI format: N1 or N2, or a newly designed format; and a CRC check code of the DCI is scrambled by using an existing SC-RNTI or a newly designed RNTI.

The SC-MCCH information change notification may also be included in a field of the same DCI carried in the first NPDCCH.

The terminal starts to monitor the first NPDCCH after first receiving the information/messages transmitted on the SC-MCCH according to the configuration information.

If an SC-MCCH information change indication is received in the DCI carried on the first NPDCCH channel, indicating that the information changes, the SC-MCCH information is acquired according to the indication of the DCI on the first NPDCCH. If the change indication indicates that the information is not changed, the terminal does not need to receive SC-MCCH information.

Example 3

As described in Example 1 and Example 2, the SC-MCCH information change notification may be indicated by one bit. When the bit is set to '1', it indicates that the SC-MCCH information is changed.

When the bit is set to '0', it indicates that the SC-MCCH information is not changed; or when the change notification does not appear, it may be that the corresponding bit does not appear, or the second NPDCCH channel does not appear, or the terminal may not detect the DCI scrambled by using the SC-N-RNTI on the second NPDCCH channel. All of which may indicate that the SC-MCCH information is not changed.

Example 4

As described in Example 1 and Example 2, the SC-MCCH information change notification may be indicated by a plurality of bits. The terminal first receives a reception service list broadcast by a cell. The list indicates an MBMS service supported by the cell; and each service is characterized by its corresponding service information. The service information may include a TMGI assigned to a particular MBMS service, and an MBMS session identity used to characterize the particular MBMS service.

In the service list, the terminal may perform sorting according to the sequence of each service in the list, or according to the values of the TMGI, or according to the values of the MBMS session identity, so as to obtain a sequence number of each service.

The plurality of bits included in the SC-MCCH information change notification may be used to indicate a sequence number corresponding to a changed service, thereby indicating the changed service.

A specific indication method may be a value method. For example, the value indicated by the plurality of bits included in the SC-MCCH information change notification is 3(011), indicating that service information of a service with sequence number 3 in the service list is changed. When the value is 0(000), it indicates that no service is changed. Alternatively, the changed service is indicated by a bitmap. For example, eight bits are included in the SC-MCCH information change notification; and the bits from low to high correspond to eight types of services with sequence numbers from 1 to 8 in the service list. If the bit corresponding to sequence number 3 is set to '1', it indicates that service information of a service with sequence number 1 is changed. If it is set to '0', it indicates that no change occurs.

When the terminal receives a change notification, the terminal first determines whether changed service information is of interest based on a serial number carried in the change notification; if so, the terminal continues to receive SC-MCCH information; if not, the terminal may ignore the current change notification without receiving the SC-MCCH information.

Figure 3:
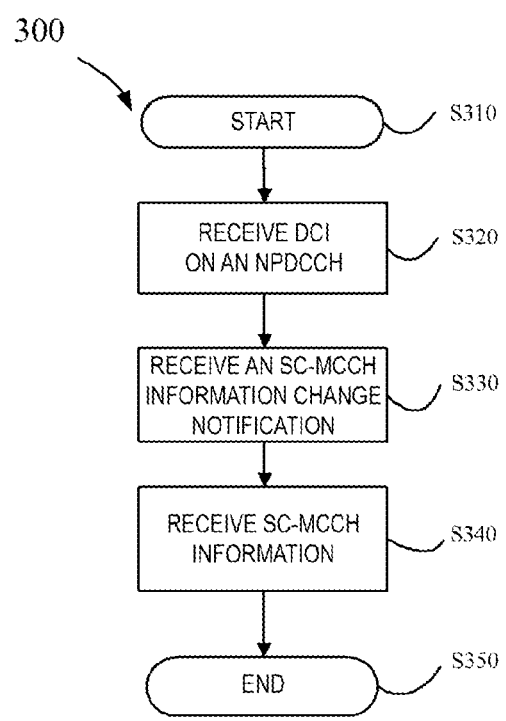
FIG. 3 is a flowchart of a method executed by UE according to an embodiment of the present application.

FIG. 3 is a flowchart of a method executed by UE according to an embodiment of the present application; and As shown in FIG. 3, a method 300 starts at step S310.

Step S320: Receive downlink control information (DCI) on a second narrowband physical downlink control channel (NPDCCH).

Step S330: Receive an information change notification for a single-cell multicast control channel (SC-MCCH) according to the information on the second NPDCCH. For example, the SC-MCCH information change notification is comprised in the DCI of the second NPDCCH or a message indicated by the DCI of the second NPDCCH.

Step S340: Receive SC-MCCH information according to an indication of DCI on a first NPDCCH.

Finally, the method 300 ends at step S350.

Figure 4:
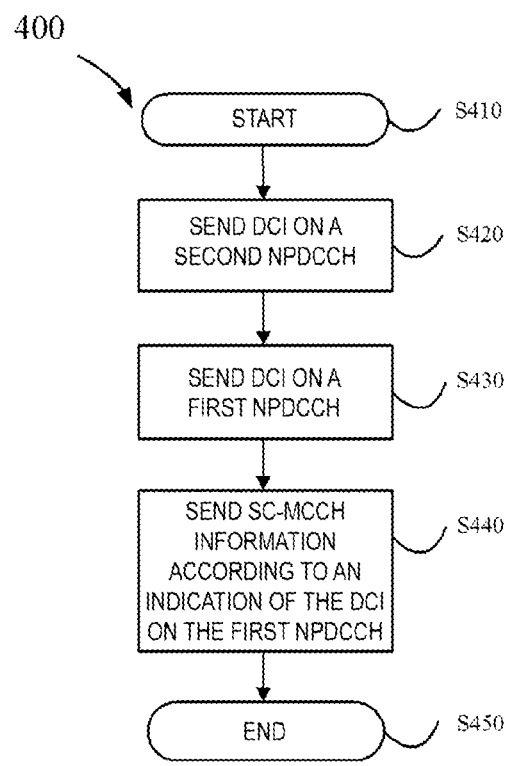
FIG. 4 is a flowchart of a method executed by a base station according to an embodiment of the present application.

FIG. 4 is a flowchart of a method executed by a base station according to an embodiment of the present application. As shown in FIG. 4, a method 400 starts at step S410.

Step S420: Transmit downlink control information (DCI) on a second narrow-band physical downlink control channel (NPDCCH), wherein the DCI or a message indicated by the DCI includes an information change notification for a single-cell multicast control channel (SC-MCCH).

Step S430: Transmit DCI on a first NPDCCH to indicate transmission of SC-MCCH information.

Step S440: Transmit the SC-MCCH information according to the indication of the DCI on the first NPDCCH.

Finally, the method 400 ends at step S450.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A User Equipment (UE) comprising:
receiving circuitry configured to receive, in more than one second subframe, a second downlink control information (DCI) format carried on a second narrowband physical downlink control channel (NPDCCH), after receiving Single-Cell Multicast Control Channel (SC-MCCH) information; and
processing circuitry configured to acquire, on the basis of a first DCI format carried on a first NPDCCH and received in more than one first subframe, another SC-MCCH information, in a case that the second DCI format indicates an SC-MCCH information change notification, wherein
a period of the more than one first subframe is different from a period of the more than one second subframe, and
the first DCI format indicates a resource for a transmission of the another SC-MCCH information.

2. The UE according to claim 1, wherein
the second DCI format includes a field of multiple bits, and
the SC-MCCH information change notification is indicated by the field of the multiple bits, one of the multiple bits indicating that a multimedia broadcast multicast service (MBMS) service is changed.

3. A base station comprising:
transmitting circuitry configured to transmit Single-Cell Multicast Control Channel (SC-MCCH) information; and
generating circuitry configured to generate a second downlink control information (DCI) format indicating an SC-MCCH information change notification, wherein
the transmitting circuitry is configured to transmit, in more than one second subframe, the second DCI format carried on a second narrowband physical downlink control channel (NPDCCH),
the generating circuitry configured to generate a first DCI format indicating a resource for a transmission of another SC-MCCH information,
the transmitting circuitry is configured to transmit, in more than one first subframe, the first DCI format carried on a first NPDDCH,
a period of the more than one first subframe is different from a period of the more than one second subframe, and the transmitting circuitry is configured to transmit the another SC-MCCH information with use of the resource indicated by the first DCI format and in accordance with the second DCI format.

4. The base station according to claim 3, wherein the second DCI format includes a field of multiple bits, and the SC-MCCH information change notification is indicated by the field of the multiple bits, one of the multiple bits indicating that a multimedia broadcast multicast service (MBMS) service is changed.

5. A method performed by a User Equipment (UE) comprising:

receiving Single-Cell Multicast Control Channel (SC-MCCH) information;

receiving, in more than one second subframe, a second downlink control information (DCI) format carried on a second narrowband physical downlink control channel (NPDCCH);

acquiring, on the basis of a first DCI format carried on a first NPDCCH and received in more than one first subframe, another SC-MCCH information, in a case that the second DCI format indicates an SC-MCCH information change notification, wherein a period of the more than one first subframe is different from a period of the more than one second subframe, and the first DCI format indicates a resource for a transmission of the another SC-MCCH information.

6. A method performed by a base station comprising:

transmitting Single-Cell Multicast Control Channel (SC-MCCH) information;

generating a second downlink control information (DCI) format indicating an SC-MCCH information change notification;

transmitting, in more than one second subframe, the second DCI format carried on a second narrowband physical downlink control channel (NPDCCH);

generating a first DCI format indicating a resource for a transmission of another SC-MCCH information;

transmitting, in more than one first subframe, the first DCI format carried on a first NPDDCH; and transmitting the another SC-MCCH information with use of the resource indicated by the first DCI format and in accordance with the second DCI format, wherein a period of the more than one first subframe is different from a period of the more than one second subframe.

* * * * *